United States Patent [19]

Takahashi et al.

[11] Patent Number: 4,974,259
[45] Date of Patent: Nov. 27, 1990

[54] CONTROL SYSTEM FOR UNATTENDED TRANSPORT CAR

[75] Inventors: Yukimichi Takahashi; Tadae Kita, both of Kanagawa, Japan

[73] Assignee: Fuji Electric Co., Ltd., Kanagawa, Japan

[21] Appl. No.: 434,469

[22] Filed: Nov. 14, 1989

Related U.S. Application Data

[63] Continuation of Ser. No. 130,450, Dec. 9, 1987, abandoned.

[51] Int. Cl.$^5$ .............................................. B61L 27/00
[52] U.S. Cl. ...................................... 455/39; 455/41; 246/5; 246/122 R
[58] Field of Search ..................... 455/39, 41; 255/384, 255/385; 364/403, 424.01, 424.02, 424.07, 436; 340/825.54, 992, 991, 993; 342/42; 246/122 R, 3, 4, 5

[56] References Cited

U.S. PATENT DOCUMENTS

| | | | |
|---|---|---|---|
| 3,610,363 | 10/1971 | Hartley | 246/3 X |
| 3,742,150 | 6/1973 | Sherman et al. | 455/41 |
| 3,933,099 | 1/1976 | Sieb | 246/5 X |
| 4,023,753 | 5/1977 | Dobler | 246/122 R X |
| 4,471,356 | 9/1984 | Gidl | 340/825.54 X |
| 4,491,967 | 1/1985 | Kobayashi et al. | 455/41 |
| 4,609,922 | 9/1986 | Boegli et al. | 340/825.54 X |
| 4,718,621 | 1/1988 | Horinouchi et al. | 246/122 R |

Primary Examiner—Benedict V. Safourek
Assistant Examiner—Ralph Smith
Attorney, Agent, or Firm—Finnegan, Henderson, Farabow, Garrett, and Dunner

[57] ABSTRACT

A control system for an unattended transport car including a plurality of ground radio transmitters dispersed in a range within which the unattended transport car is movable, the transmitters transmitting positional information or the like by radio. The unattended transport car is provided with detecting means for detecting in a non-contact manner positional information concerning each of the ground radio transmitters memory means for storing a traveling course from a specific start point to a specific end point in the form of a series of pieces of positional information concerning the ground radio transmitters, and control means for effecting traveling course control and start-stop control every time the car passes one of the ground radio transmitters by constantly or intermittently comparing the positional information concerning each ground radio transmitter detected by the detecting means with the contents stored in the memory means. Thus, it is possible to realize traveling control of high reliability with a simplified control program. Further, the unattended transport car is able to determine whether to move forward or backward, turn right or left and stop or proceed.

7 Claims, 3 Drawing Sheets

| DATA ITEM ORDER | CONTENTS | SECTION NUMBER |
|---|---|---|
| 1 | NUMBER OF THIS SECTION | R9 |
| 2 | NUMBER OF LEFT FORWARD SECTION | R6 |
| 3 | NUMBER OF FORWARD SECTION | R10 |
| 4 | NUMBER OF RIGHT FORWARD SECTION | R13 |
| 5 | NUMBER OF LEFT BACKWARD SECTION | R5 |
| 6 | NUMBER OF BACKWARD SECTION | R8 |
| 7 | NUMBER OF RIGHT BACKWARD SECTION | R12 |

CONTROL SYSTEM FOR UNATTENDED TRANSPORT CAR

This application is a continuation of application Ser. No. 07/130,450, filed Dec. 9, 1987, now abandoned.

BACKGROUND OF THE INVENTION

1. Field of the Invention

The present invention relates to a system for controlling the traveling course as well as the starting and stopping of an unattended transport car.

2. Description of the Related Art

In a typical known unattended transport car control system of the type described above, markers are provided at every turning point and every stop point along a predetermined traveling course of an unattended transport car. The markers are detected by means of an optical sensor mounted on the car, and determinations as to forward or backward movement, right or left turns and stopping or proceeding are made in accordance with a program that supervises movement of the unattended transport car.

The prior systems, however, suffer from several problems. For instance, the markers must be disposed with a high degree of accuracy because of the required positional relationship between the markers and the sensing thereof by the optical sensor mounted on the unattended transport car.

Also, the size of the markers is limited and they cannot carry sufficient information, such as traveling instructions that are to be given to the unattended transport car in advance or at the start of traveling. Moreover, the markers provided along the traveling course are readily contaminated making it likely that the system for controlling the unattended transport car will malfunction.

SUMMARY OF THE INVENTION

In view of the above-described circumstances, it is an object of the present invention to provide a control system that is capable of reliably controlling the movement of an unattended transport car remotely and in a non-contact manner.

Another object of the present invention is to provide a control system for unattended transport cars that does not employ optical sensors or the like.

These and other objects are accomplished by a control system for an unattended transport car comprising a plurality of ground radio transmitters disposed within the range that the unattended transport car is movable for transmitting positional information, detecting means provided on the car for detecting the positional information transmitted from the ground radio transmitters, memory means provided on the car for storing a traveling course from a specific start point to a specific end point in the form of a series of positional information data concerning the ground radio transmitters, and control means provided in the car for controlling movement of the car by comparing the positional information from the ground radio transmitters detected by the detecting means with the contents stored in the memory means.

BRIEF DESCRIPTION OF THE DRAWINGS

The manner by which the above objects and other objects, features and advantages of the present invention are achieved will become clear from the following description of the preferred embodiment thereof taken in conjunction with the accompanying drawings, wherein.

DESCRIPTION OF THE PREFERRED EMBODIMENT

In one preferred embodiment of the present invention, a ground radio transmitter is battery-operated and incorporates a radio transmitter and an IC memory. The transmitter may be buried in the ground or floor within a traveling section in the range of the car at each stop section along a predetermined traveling course. Each ground radio transmitter is stored with the number of a section where it is buried, together with the numbers of all the sections that are adjacent thereto (i.e., a small-sized map). The unattended transport car is provided with a series of the numbers of sections from a start point to an end point in advance or at the time of starting travel and is not given detailed instructions to move forward or backward, turn right or left, or stop. The unattended transport car determines whether to move forward or backward, turn right or left and stop or not as it travels until it reaches the end point on the basis of map information sent from the above-described ground radio transmitters.

Figure 1:
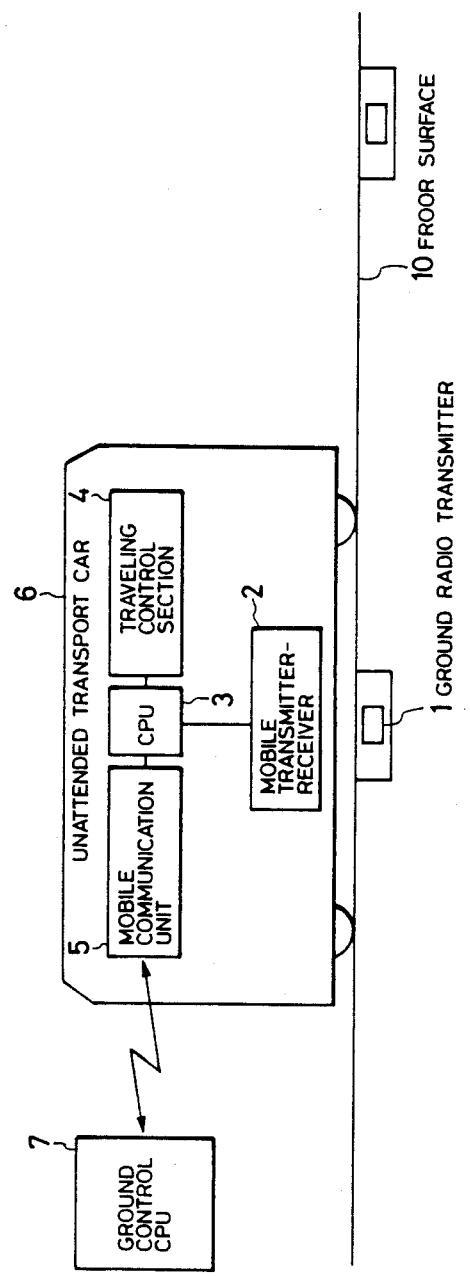
FIG. 1 shows the general arrangement of one embodiment of the unattended transport car control system according to the present invention.

FIG. 1 shows the general arrangement of one embodiment of the unattended transport car control system according to the present invention.

As shown in FIG. 1, this embodiment comprises a CPU 3, a traveling control section 4, a mobile communication unit 5 and a mobile transmitter-receiver 2, which are mounted on an unattended transport car 6, a ground radio transmitter 1 that is buried in a floor surface 10, and a ground control CPU 7.

The CPU 3 mounted on the unattended transport car 6 receives a series of section numbers from a start point to an end point, or the section number of the end point alone (in this case, however, predetermined traveling section numbers must be stored in the CPU 3 on the car 6 in advance) from the ground control CPU 7 through the mobile communication unit 5, and starts controlled movement of the car 6.

During the traveling of the unattended transport car 6, the CPU 3 on the car 6 receives successively the number of a section where the car 6 is present, together with the numbers of all the sections which are adjacent to the present section, from the ground radio transmitter 1 buried in the floor surface 10 through the mobile transmitter-receiver 2 to determine whether to control the transport car to move forward or backward, turn right or left and stop or not, and the CPU 3 outputs appropriate traveling control commands to the traveling control section 4.

Figures 2, 3:
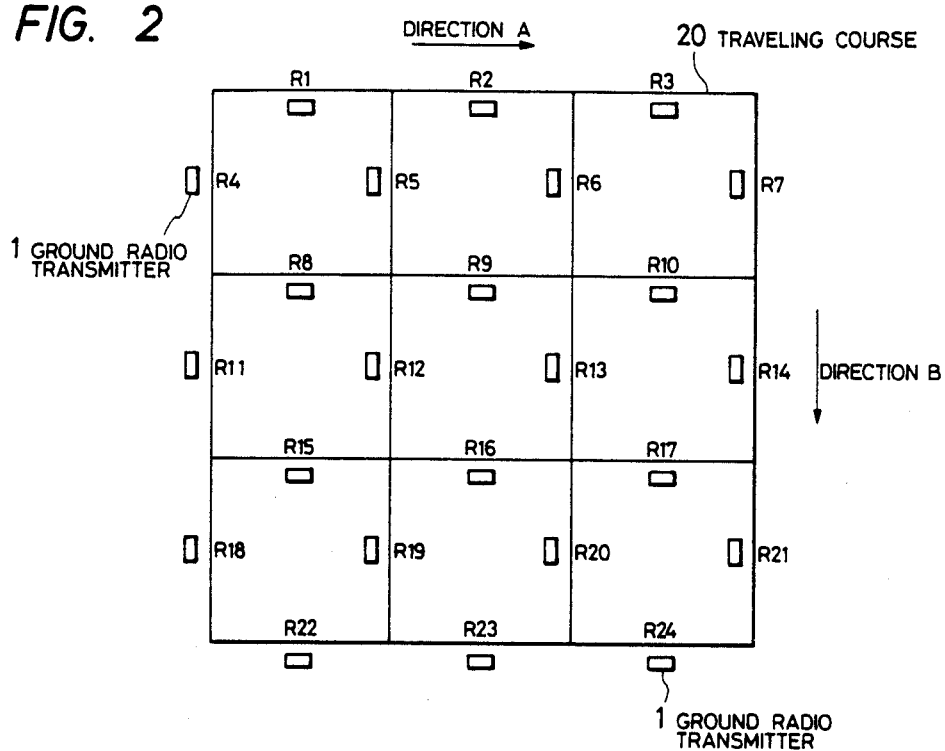
FIG. 2 is a plan view showing a range within which the unattended transport car can travel.
FIG. 3 shows data items which are transmitted from one ground radio transmitter.

FIG. 2 shows one example of the traveling course layout for the unattended transport car 6. The figure shows a plurality of ground radio transmitters 1 (represented by small rectangles) which are buried in a range within which the car 6 can travel. The reference characters which are put along a traveling course 20 denote the respective numbers of the sections of the traveling course 20. Each of the arrows A and B indicates the "forward" direction in terms of the traveling of the unattended transport car 6.

To cause the car 6 to travel from the section R1 to the section R21, a series of section numbers (e.g., R1-R5-R9-R13-R17-R21) from the start point to the end point are transmitted from the ground control CPU 7 to the CPU 3 on the car 6. Thus, every time the unattended transport car 6 enters a subsequent section, the CPU 3 determines whether to turn right or left and move forward or backward on the basis of the traveling section information sent from the ground radio transmitters 1 and gives instructions to the traveling control section 4. When the car 6 arrives at the end point, the CPU 3 gives instructions to the traveling control section 4 to stop the car 6.

Data items that are transmitted from the ground radio transmitters 1 must be arranged regularly so that the CPU 3 on the unattended transport car 6 can effectively make the above-described determination. For example, date items such as those shown in FIG. 3 may be stored in the ground radio transmitter 1 buried in the section R9, and transmitted from the radio transmitter 1. It is necessary to store section information in the same sequence in the ground radio transmitters 1 buried in the other sections.

Figure 4:
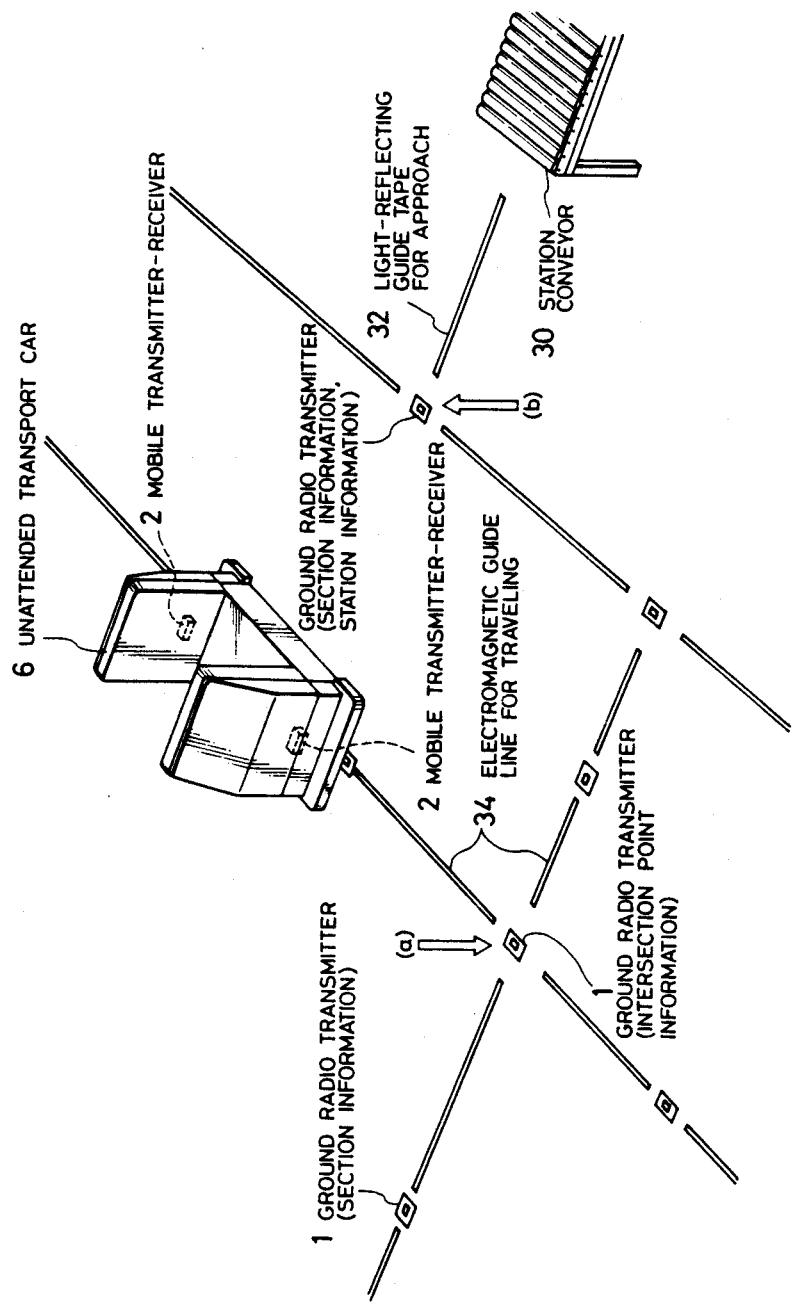
FIG. 4 schematically shows an embodiment of the system of the present invention.

FIG. 4 schematically shows the system according to this embodiment which has been described with reference to FIGS. 1 to 3. The system includes a station conveyor 30, a light-reflecting guide tape 32 for approach, and electromagnetic guide lines 34 for traveling. To change the course of the unattended transport car 6 at the position (a) shown in FIG. 4, the car 6 makes a spin turn at the intersection point. When the car 6 is to approach the station conveyor 30, the car 6 stops at the position (b) and then effects sideward slide traveling along the light-reflecting guide tape 32.

It is possible to obtain several advantages by practicing the present invention. For example, unlike the markers in the prior art, the ground radio transmitters in accordance with the present invention are free from contamination or other similar problems. Since the section numbers which are stored in the ground radio transmitters are absolute addresses, it is possible to realize traveling control with high reliability. Also, since each ground radio transmitter not only transmits the number of a section where the transmitter concerned is buried but also the numbers of all the adjacent sections, the unattended transport car is able to determine whether to move forward or backward, turn right or left and stop or not by itself. Further, since the ground computer that controls the traveling of the unattended transport car need not output instructions to the car to move forward or backward, turn right or left, or stop every time the car enters a subsequent traveling section, it is possible to simplify the traveling control program for the ground computer by a large margin. Also, since the section numbers stored in the ground radio transmitters can be rewritten by a radio transmission, the layout can readily be changed.

Although the present invention has been described through specific terms, it should be noted that the described embodiment is not limited thereto, and that various changes and modifications may be made without departing from the scope of the invention.

What is claimed is:

1. A control system for controlling the movement of an unattended transport car comprising:
   a pathway having a plurality of bidirectional route segments disposed to define a plurality of different routes between a specific start point and a specific end point for guiding the movement of the unattended car over a selected route, each of said route segments adjoining other of said route segments at a respective route intersection at opposite ends of said each route segment;
   a first ground radio transmitter disposed intermediate the opposite ends of each of said plurality of route segments for transmitting information relating to the identity of said corresponding route intersection;
   a second ground radio transmitter disposed at a corresponding one of said route intersections for transmitting positional information relating to the identity of said corresponding route intersection;
   detecting means provided on the car for detecting the identity of each route segment and intersection transmitted by said first and second ground radio transmitters;
   memory means provided on the car for storing traveling course data corresponding to the identity of a plurality of route segments corresponding to a selected route from said specific start point to said specific end point; and
   control means provided on the car for selecting a route segment contiguous to the identified route segment from said stored travelling course data in response to the identity of the route segment and intersection detected from said first and second ground radio transmitters, and providing instructions to control the routing of the car in accordance with each successive selected route segment.

2. A control system according to claim 1, wherein said detecting means comprises a radio receiver and said control means comprises a mobile control processing unit.

3. A control system according to claim 2, further including a ground control CPU for providing said traveling course data to said memory means through said mobile control processing unit; and
   a mobile communication unit provided on the car for receiving said traveling course data from said ground control CPU and supplying said received traveling course data to said mobile control processing unit.

4. A control system according to claim 1, wherein said traveling course data relates to the sequence of each first ground radio transmitter to be passed by the car during traverse of said selected route.

5. A method for controlling the movement of an unattended transport car comprising the steps of:
   providing a pathway having a plurality of bidirectional route segments disposed to define a plurality of different routes between a specific start point and a specific end point for guiding the movement of the unattended car over a selected route, each of said route segments adjoining other of said route segments at a respective route intersection at opposite ends of said each route segment;
   positioning a first ground radio transmitter disposed intermediate the opposite ends of each of said plurality of route segments for transmitting information relating to the identity of a corresponding one of said plurality of route segments and the identity of all adjacent route segments joining said corresponding route segment at opposite ends;

positioning a second ground radio transmitter disposed at a corresponding one of said route intersections for transmitting information relating to the identity of said corresponding route intersection;

detecting the identity of each route segment and intersection transmitted by said first and second ground radio transmitters;

storing travelling course data corresponding to the identity of a plurality of route segments corresponding to a selected route from said specific start point to said specific end point;

selecting a routed segment contiguous to the identified route segment from said stored travelling course data in response to the identity of the route segment and intersection detected from said first and second ground radio transmitters; and providing instructions for controlling the routing of the car in accordance with each successive selected route segment.

6. A method according to claim 5, further including the step of providing said traveling course data from a ground control CPU to memory means provided on the unattended car.

7. A method according to claim 6, wherein said traveling course data relates to the sequence of each said first ground radio transmitter to be passed by the car during traverse of said selected route.

* * * * *

UNITED STATES PATENT AND TRADEMARK OFFICE
CERTIFICATE OF CORRECTION

PATENT NO. : 4,974,259
DATED : November 27, 1990
INVENTOR(S) : Hiroyuki Ohmura et al.

It is certified that error appears in the above-identified patent and that said Letters Patent is hereby corrected as shown below:

In DRAWING

Drawings, Figure 1, change "FROOR" to --FLOOR--.

Column 3, line 22, change "date" to --data--.

Signed and Sealed this

Thirtieth Day of March, 1993

*Attest:*

STEPHEN G. KUNIN

*Attesting Officer*     *Acting Commissioner of Patents and Trademarks*